C. J. ANDERSON.
HARROW.
APPLICATION FILED JAN. 4, 1916.
1,225,204.
Patented May 8, 1917.
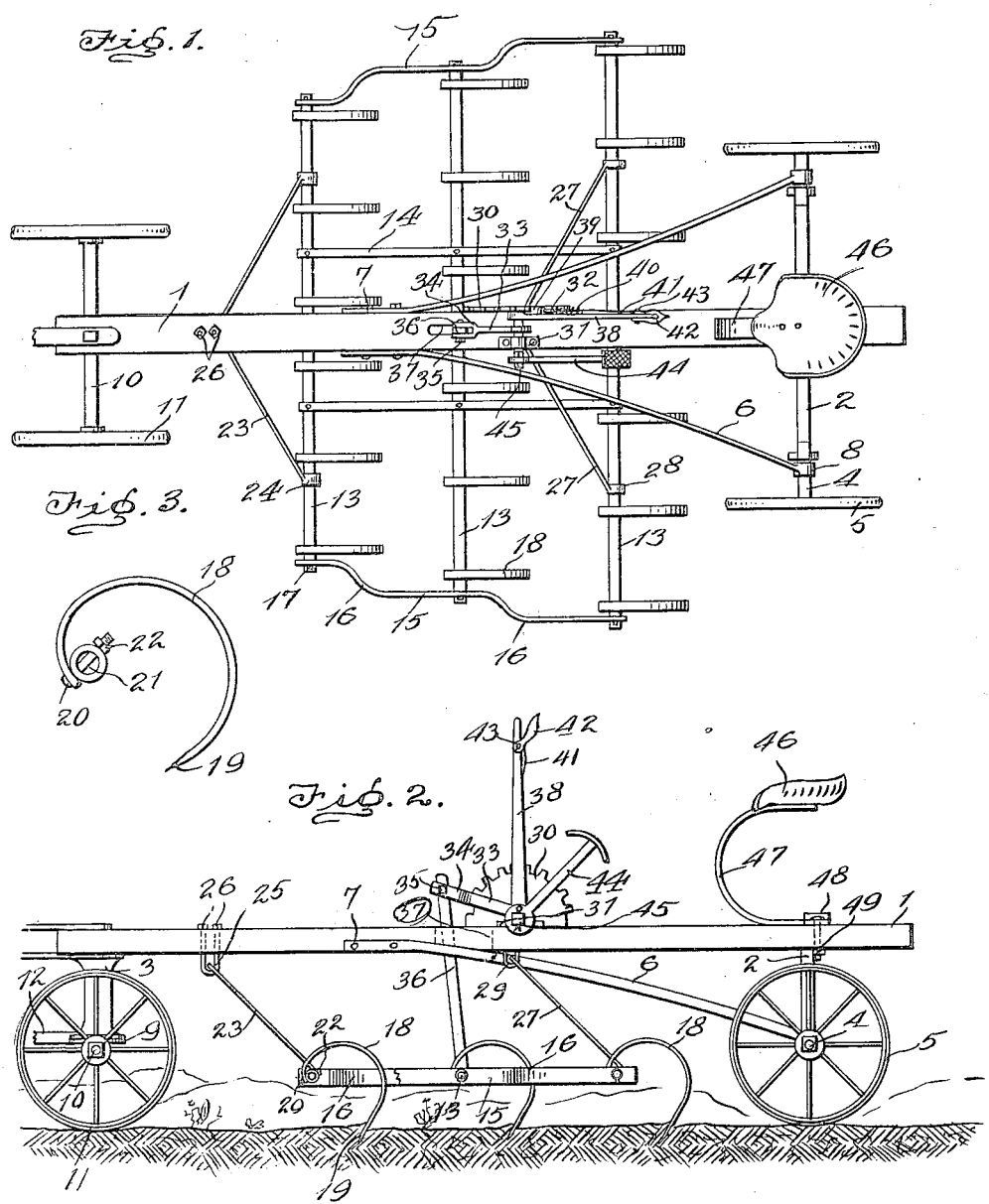
INVENTOR
Carl J. Anderson.
WITNESS
Edw. S. Hall.
BY Richard Owen.
ATTORNEY

UNITED STATES PATENT OFFICE.

CARL J. ANDERSON, OF SANBORN, NORTH DAKOTA.

HARROW.

1,225,204.     Specification of Letters Patent.     Patented May 8, 1917.

Application filed January 4, 1916. Serial No. 70,288.

*To all whom it may concern:*

Be it known that I, CARL J. ANDERSON, a citizen of the United States, residing at Sanborn, in the county of Barnes and State of North Dakota, have invented certain new and useful Improvements in Harrows, of which the following is a specification.

My invention relates to harrows and the primary object thereof resides in the provision of novel means for maintaining the harrow tooth frame as well as novel means for raising and lowering the harrow tooth frame on the main vehicle frame.

Another object of my invention resides in the provision of novel foot lifting means for the harrow tooth frame, novel means being also provided for removably holding the harrow tooth frame in varied adjusted positions with respect to the main vehicle frame and incidentally to the ground.

A still further object of my invention resides in the provision of a device of the character described that is simple in construction, efficient in operation and one that can be manufactured and placed on the market at a minimum cost.

Other objects as well as the nature, characteristic features and scope of my invention will be more readily understood from the following description taken in connection with the accompanying drawings and pointed out in the claim forming a part of this specification.

In the drawings:—

Figure 1 is a top plan view of my invention;

Fig. 2 is a side elevational view of my invention, harrow teeth being in engagement with the ground; and Fig. 3 is an enlarged side elevational view of one of the spring teeth and the means for connecting the tooth to the harrow tooth frame.

Referring more particularly to the drawings in which similar reference numerals designate like or corresponding parts throughout the various views I provide a vehicle frame including a horizontal beam 1 from adjacent the respective ends of which depend vehicle bolsters 2 and 3. An axle 4 is connected to the rear bolster and has rigidly mounted on the respective ends thereof supporting wheels 5, said axle being braced through the medium of braces 6 which extend from opposite sides substantially intermediate the ends of the beam as indicated by the numeral 7 the free ends terminating in collars 8 which are mounted about the shaft 4 adjacent the respective ends thereof. The forward bolster 3 has a fifth wheel 9 connected thereto with which is associated the forward axle 10 on the respective ends of which are rotatably mounted supporting wheels 11 similar to the wheels 5. A tongue 12 is also associated with the fifth wheel.

Associated with the under surface of the beam intermediate the front and rear supporting wheels is my novel harrow tooth frame. This frame comprises a plurality of transversely arranged rods 13 tubular in cross section, and connected in spaced parallel relation with each other through the medium of a plurality of uniformly spaced and parallelly arranged bars 14. The transverse rods increase in length toward the rear axle each successive rod being slightly longer than the one in advance thereof. The outer ends of the rods are braced through the medium of longitudinally arranged end bars 15 the respective ends of which are offset as indicated by the numeral 16 so that they may be engaged upon the free ends of each of the rods 13. Cotter pins or like fastening devices 17 serve to maintain engagement of the bars 15 with the rods 13. A plurality of arcuate spring teeth 18 having pointed round engaging ends 19 are rigidly connected to the transverse rods and arranged in alternate relation with each other so as to efficiently engage the soil when in operation. Bolts 20 extend through the inner ends of the teeth and also transversely through the rods 13 as indicated by the numeral 21 being removably maintained in position through the medium of nuts 22. In order to connect the harrow tooth frame to the beam I have connected the respective ends of an inverted V-shaped rod 23 to the forward rod 13 through the medium of collars 24 the inverted V-shaped rod being movably connected to the under surface of the beam adjacent the forward end thereof through the medium of a U-shaped bolt 25 and nuts 26. The rear end of the harrow tooth frame is movably connected to the under surface of the beam substantially intermediate the ends thereof through the medium of another V-shaped rod 27, connection being maintained with the rear rod 13 through the medium of collars 28 and with the beam through the medium of a U-shaped fastening element 29.

For the purpose of raising and lowering the harrow tooth frame so that the teeth 18 will engage the ground when it is desired to treat the soil and so that they will be maintained out of engagement with the ground when the vehicle frame is being moved from one place to another, I have provided my improved lifting means. In the present instance I have connected the segmental rack 30 to one side of the beam 1 substantially intermediate the ends thereof and preferably above the element 29. Rotatably mounted in the segmental rack and in a bracket 31 and resting upon the beam is a stub shaft 32 from which extends an arm 33 the outer ends of the rod being bifurcated as indicated by the numeral 34. Pivotally connected through the bifurcations preferably through the medium of the nut and bolt arrangement 35 is one end of the connecting rod 36 which is arranged through the longitudinal slot 37 in the beam, the lower end of the rod being connected to the intermediate rod 13. A lever 38 extends from the stub shaft at an angle to the arm, said lever being arranged in close relation with the arcuate segmental gear 30 and resiliently mounted thereon a pawl 39 through the medium of a coil spring 40. A rod 41 extends from the pawl and is connected to a handle 42 pivotally mounted as at 43 adjacent the outer ends of the lever. It will be observed by pressing the handle toward the lever the pawl will be drawn from engagement with the teeth on the rack to permit the unlocking of the stub shaft consequently to either raise or lower the harrow tooth frame. To assist in the lifting of the frame I have provided my improved foot lever 44 the inner end of which is enlarged and mounted about the squared projecting end 45 of the stub shaft. This foot lever projects from the stub shaft at an angle to the lever 38 and at an opposite direction to the direction of the arm 33, the outer end thereof being positioned near the driver's seat 46 resiliently mounted on the rear end of the beam through the medium of a U-shaped resilient element 47 the inner end of which is connected to the beam through the medium of a strap and nut and bolt arrangement 49.

The operation of my invention is as follows.

Assuming that the invention has been assembled in the manner described and that it is in a position as illustrated in Fig. 2 of the drawings, as the vehicle frame is being moved forwardly over the ground the spring teeth 19 will treat the soil and because of the arrangement of these teeth on the rods 13, the treatment is facilitated. Should it be desired to raise the harrow tooth frame so that the main vehicle frame can be moved from place to place the handle 42 is moved toward the lever 38 and the lever is moved rearwardly which also transmits an upward swinging movement to the arm 33 and because of the connection of the rod 36 therewith and with the harrow tooth frame the frame is lifted and maintained in a raised position by releasing the handle 42 which allows the bolt 39 to engage the teeth of the segmental rack 30. If desired, when the handle 42 is moved toward the lever to release the pawl, the foot lever 44 can be pressed downwardly to more conveniently raise the harrow frame.

Although I have shown and described the preferred embodiment of my invention I desire it to be understood that I am not to be limited to the exact details shown, however, I desire that great stress be laid upon the arrangement of the novel means for raising the harrow tooth frame and the means for mounting the frame on the beam. Attention is also directed to the teeth on the frame.

From the above description taken in connection with the accompanying drawings, it can easily be seen that I have provided a device that is simple in construction, containing but a few simple parts that can be cheaply manufactured and assembled and when assembled can be placed upon the market and sold at a minimum cost.

It will be understood that the above description and accompanying drawings comprehend only the general embodiment of my invention and that various minor changes in detail of construction, proportion and arrangement of the parts may be made within the scope of the appended claim and without sacrificing any of the advantages of my invention.

Having thus fully described my invention what I claim as new and desire to secure by Letters Patent, is:

A harrow including a beam having a slot therein, means for supporting the beam in spaced relation to the ground, a harrow frame disposed transversely of the beam, inverted V-shaped supports pivoted at their vertices and the undersurface of the beam and connected at their outer ends to the harrow frame, a segmental rack connected to the side of the beam, a transversely arranged stub shaft having one end rotatably mounted in the rack, a bracket straddling the other end of the shaft and holding it on the beam, a rigid arm extending from the shaft, a rod arranged through the slot and having the respective ends thereof pivoted to the arm and the frame, a foot lever rigid with the shaft and extending therefrom whereby when depressed the arm and consequently the frame will be raised, a hand lever rigidly connected to and extending from the shaft, a pawl slidably mounted on the hand lever for engaging the rack to hold the frame in various adjusted positions, and means for releasing the pawl whereby to permit of the actuation of the foot lever.

In testimony whereof I affix my signature in presenc of two witnesses.

CARL J. ANDERSON.

Witnesses:
 Louis Malm,
 Harold J. Malm.

Copies of this patent may be obtained for five cents each, by addressing the "Commissioner of Patents, Washington, D. C."